US010213749B2

(12) United States Patent
Miyahara et al.

(10) Patent No.: US 10,213,749 B2
(45) Date of Patent: Feb. 26, 2019

(54) SEPARATION MEMBRANE STRUCTURE AND METHOD FOR MANUFACTURING SAME

(71) Applicant: NGK INSULATORS, LTD., Nagoya-Shi (JP)

(72) Inventors: Makoto Miyahara, Nagoya (JP); Makiko Ichikawa, Nagoya (JP); Naoto Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/583,021

(22) Filed: May 1, 2017

(65) Prior Publication Data

US 2017/0232401 A1    Aug. 17, 2017

Related U.S. Application Data

(63) Continuation of application No. PCT/JP2015/084267, filed on Dec. 7, 2015.

(30) Foreign Application Priority Data

Dec. 9, 2014 (JP) .................................. 2014-249096

(51) Int. Cl.
*B01D 53/22* (2006.01)
*B01D 63/06* (2006.01)
(Continued)

(52) U.S. Cl.
CPC ......... *B01D 71/028* (2013.01); *B01D 53/228* (2013.01); *B01D 63/066* (2013.01);
(Continued)

(58) Field of Classification Search
CPC .............. B01D 53/22; B01D 53/228; B01D 2053/223; B01D 63/066; B01D 67/0046;
(Continued)

(56) References Cited

U.S. PATENT DOCUMENTS

2006/0213165 A1* 9/2006 Isomura ............... B01D 63/061
55/523
2010/0298115 A1* 11/2010 Yajima ................. B01D 71/028
502/4
(Continued)

FOREIGN PATENT DOCUMENTS

JP    62-129104    *  6/1987  ............. B01D 13/00
JP    62-129104 A1    6/1987
(Continued)

OTHER PUBLICATIONS

International Search Report and Written Opinion (Application No. PCT/JP2015/084267) dated Mar. 8, 2016.
(Continued)

*Primary Examiner* — Jason M Greene
(74) *Attorney, Agent, or Firm* — Burr & Brown, PLLC (57) ABSTRACT

A separation membrane structure comprising a porous support, a first glass seal, and a separation membrane. The porous support includes through-holes which connect a first end surface and a second end surface. The first glass seal is configured to cover the first end surface. The separation membrane is formed on an inner surface of the through-holes. The first glass seal has a first seal body part and a first extension part. The first seal body part is disposed on the first end surface. The first extension part is connected to the first seal body part and disposed on the inner surface of the through-holes. The separation membrane has a first connection part connected to the first extension part of the first glass seal. A first thickness of the first connection part is less than or equal to 10 microns, and less than or equal to 3.2 times a center thickness at a longitudinal center of the separation membrane.

10 Claims, 5 Drawing Sheets

(51) Int. Cl.
  B01D 65/00 (2006.01)
  B01D 67/00 (2006.01)
  B01D 69/04 (2006.01)
  B01D 69/12 (2006.01)
  B01D 71/02 (2006.01)
  C01B 39/48 (2006.01)

(52) U.S. Cl.
  CPC ....... B01D 65/003 (2013.01); B01D 67/0046 (2013.01); B01D 67/0051 (2013.01); B01D 69/04 (2013.01); B01D 69/12 (2013.01); C01B 39/48 (2013.01); *B01D 2053/223* (2013.01); *B01D 2256/245* (2013.01); *B01D 2257/504* (2013.01); *B01D 2313/04* (2013.01); *B01D 2323/42* (2013.01); *Y02C 10/10* (2013.01)

(58) Field of Classification Search
  CPC .... B01D 67/0051; B01D 69/04; B01D 69/12; B01D 71/028; B01D 2323/00; C01B 39/14
  See application file for complete search history.

(56) References Cited

U.S. PATENT DOCUMENTS

| | | | | |
|---|---|---|---|---|
| 2010/0300294 A1* | 12/2010 | Clinton | ................. | B01D 53/22 96/10 |
| 2012/0000358 A1* | 1/2012 | Kawai | ................. | B01D 53/228 95/46 |
| 2012/0018370 A1* | 1/2012 | Takahashi | ............ | B01D 53/228 210/490 |
| 2012/0091056 A1* | 4/2012 | Satoh | ................... | B01D 63/066 210/490 |
| 2012/0272826 A1* | 11/2012 | Uchikawa | ............ | B01D 53/228 96/8 |
| 2013/0043186 A1* | 2/2013 | Araki | ................ | B01D 67/0067 210/634 |
| 2014/0021129 A1* | 1/2014 | Teranishi | ............. | B01D 63/066 210/500.26 |
| 2014/0208707 A1 | 7/2014 | Teranishi et al. | | |
| 2014/0374341 A1* | 12/2014 | Wada | ................ | B01D 67/0067 210/500.21 |

FOREIGN PATENT DOCUMENTS

| | | |
|---|---|---|
| JP | 2001-300273 A1 | 10/2001 |
| JP | 2009-226306 A1 | 10/2009 |
| JP | 2010-110704 A1 | 5/2010 |
| JP | 2013-034994 A1 | 2/2013 |
| WO | 2009/113715 A1 | 9/2009 |
| WO | 2013/054794 A1 | 4/2013 |
| WO | 2013/136869 A1 | 9/2013 |
| WO | WO 2013/136869 A1 * | 9/2013 ............. B01D 71/02 |

OTHER PUBLICATIONS

English translation of International Preliminary Report on Patentability (Application No. PCT/JP2015/084267) dated Jun. 22, 2017.

* cited by examiner

SEPARATION MEMBRANE STRUCTURE AND METHOD FOR MANUFACTURING SAME

TECHNICAL FIELD

The present invention relates to a separation membrane structure and to a method of manufacturing the same.

BACKGROUND ART

A separation membrane structure is known to typically comprise a columnar porous support that includes a plurality of through-holes connecting both end surfaces, a pair of glass seals covering both end surfaces of the porous support, and a zeolite membrane formed on an inner surface of each through-hole (for example, reference is made to PCT Laid Open Application 2013/054794). This type of separation membrane structure finds suitable application in relation to liquid separation or gas separation due to superior mechanical strength and durability.

The manufacturing steps of the zeolite membrane include a step of using the weight of a slurry including a dispersion of zeolite particles to cause flow through each through-hole, a step of drying the slurry that has become attached to the inner surface of each through-hole, and a step of placing the porous support in a formulated starting material solution to thereby form a zeolite membrane by hydrothermal synthesis (for example, reference is made to Japanese Patent Application Laid Open No. 2013-34994).

SUMMARY OF THE INVENTION

Technical Problem

However, in the step of causing flow of the slurry into the through-holes, although the surplus slurry flows out of the opening on the lower side of the through-holes, in the event that there is a lower glass seal formed into the lower opening, the slurry tends to accumulate before the lower glass seal.

Consequently, during drying of the slurry or during heating processes after membrane formation, there is a problem that cracks tend to form in the portion of the membrane formed in proximity to the glass seal.

This problem is not limited to zeolite membrane, and is caused in any separation membrane (for example, a silica membrane or carbon membrane or the like) that is formed by use of a downflow method.

The present invention is proposed in light of the situation described above, and has the purpose of providing a separation membrane structure that can suppress cracks in a separation membrane, and a method of manufacturing the same.

Solution to Problem

The separation membrane structure of the present invention includes a porous support, a first glass seal and a separation membrane. The porous support includes through-holes which connect a first end surface and a second end surface. The first glass seal covers the first end surface. The separation membrane is formed on an inner surface of the through-holes. The first glass seal has a first seal body part that is disposed on the first end surface, and a first extension part that is connected to the first seal body part and is disposed on the inner surface of the through-holes. The separation membrane has a first connection part that is connected to the first extension part of the first glass seal. A first thickness of the first connection part is less than or equal to 10 microns, and less than or equal to 3.2 times the center thickness at the longitudinal center of the separation membrane.

Effect of Invention

The present invention enables the provision of a separation membrane structure that can suppress cracks in a separation membrane and a method of manufacturing the same.

DESCRIPTION OF EMBODIMENTS

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different between the figures.

Structure of Separation Membrane Structure 100

Figure 1:
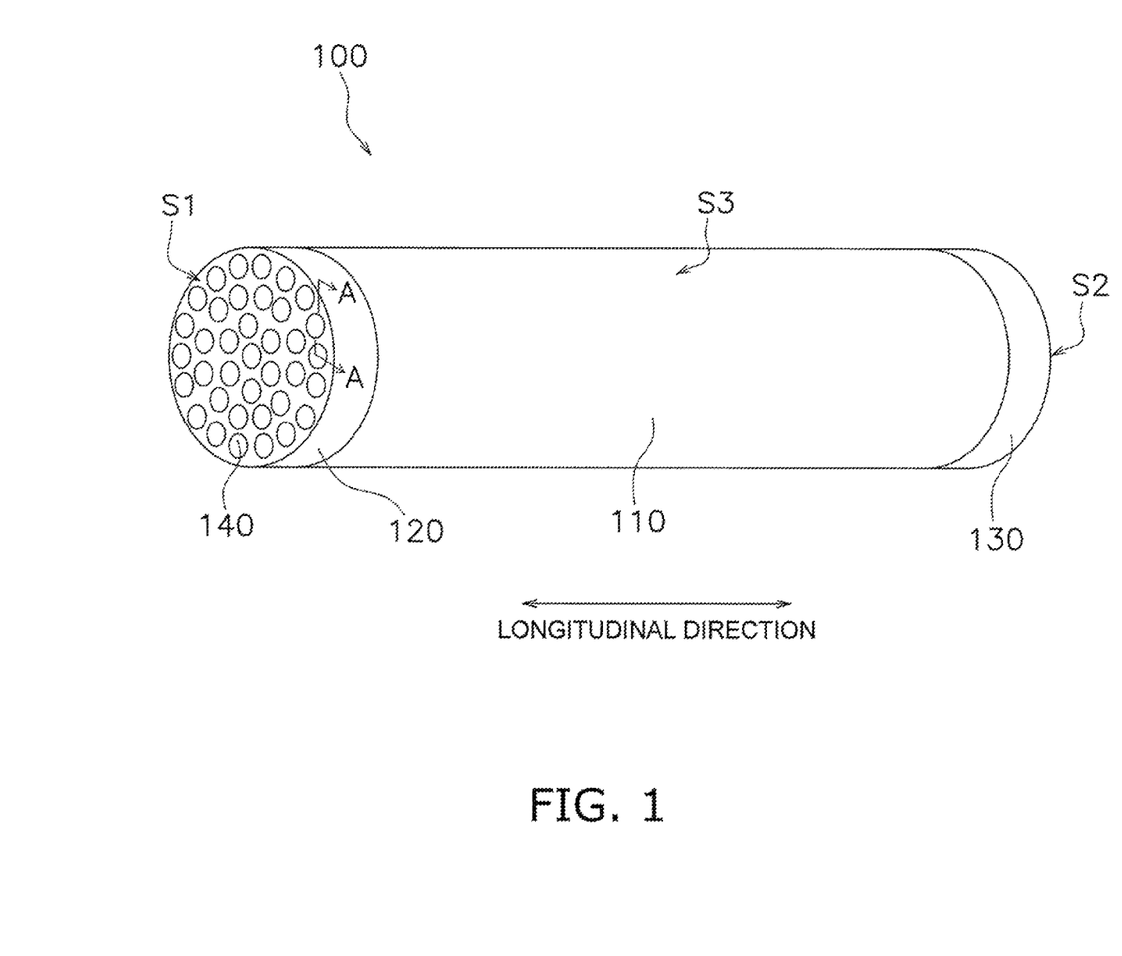
FIG. 1 is a perspective view illustrating a separation membrane structure.
Figure 2:
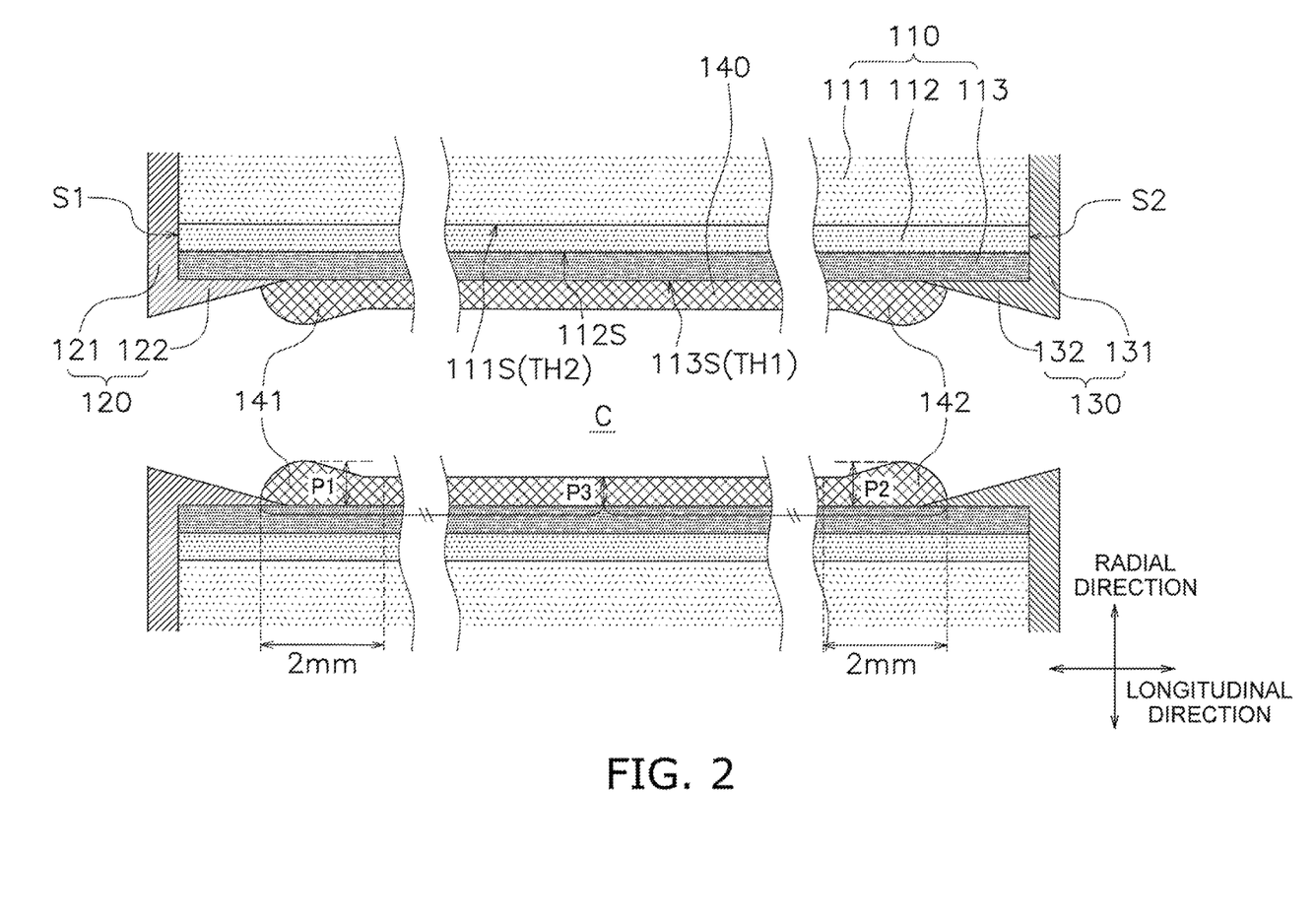
FIG. 2 is a cross sectional view along A-A in FIG. 1.

FIG. 1 is a perspective view illustrating a separation membrane structure. FIG. 2 is a cross sectional view along A-A in FIG. 1.

The separation membrane structure 100 includes a porous support 110, a first glass seal 120, a second glass seal 130 and a separation membrane 140.

The porous support 110 is formed in a cylindrical shape. The length of the porous support 110 in a longitudinal direction is 150 to 200 mm, and the diameter of the porous support 110 in a short width direction is 30 to 220 mm.

The porous support 110 has a first end surface S1, a second end surface S2, a side surface S3, and a plurality of first through-holes TH1. The first end surface S1 is provided opposite to the second end surface S2. The side surface S3 is a columnar surface that connects the outer edge of the first end surface S1 to the outer edge of the second end surface S2. The first through-holes TH1 pass through the porous support 110. The first through-holes TH1 connect the first end surface S1 with the second end surface S2. The cross sectional shape of the first through-holes TH1 is circular. The inner diameter of the first through-holes TH1 is 1 to 5 mm.

The porous support 110 as shown in FIG. 2 is configured by a substrate 111, a first support layer 112 and a second support layer 113.

The substrate 11 is formed as a cylinder. A plurality of second through-holes TH2 is formed in the substrate 111.

The second through-holes TH2 pass through the substrate 111. The second through-holes TH2 connect the first end surface S1 with the second end surface S2. The second through-holes TH2 are located on the outer side of the first through-holes TH1.

The substrate 11 is configured from a porous material. The porous material includes use of a ceramic, metal, resin, or the like. The ceramic material includes use of alumina ($Al_2O_3$), titania ($TiO_2$), mullite ($Al_2O_3 \cdot SiO_2$), potsherd, and cordierite ($Mg^2Al_4Si_5O_{18}$), or the like.

The substrate 111 may include an inorganic binder. The inorganic binder may include at least one of titania, mullite, sinterable alumina, silica, glass fits, clay minerals, and sinterable cordierite.

The porosity of the substrate 111 may be configured to 25% to 50%. The average pore diameter of the substrate 111 may be 5 microns 25 microns. The average particle diameter and the porosity of the substrate 111 may be measured by a mercury porosimeter. The average particle diameter of the substrate 111 may be configured as 10 microns to 100 microns. In the present embodiment, the term "average particle diameter" denotes the value of the arithmetic mean for the maximum diameter of 30 measured particles that are measured with reference to cross sectional micro-structure observation by use of a scanning electron microscope (SEM).

The first support layer 112 is disposed on the inner surface 111S of the second through-holes TH2 formed on the substrate 111. Consequently, the first support layer 112 is formed in a tubular shape. The first support layer 112 may be formed using the same material used to configure the substrate 111. The thickness of the first support layer 112 may be configured 10 microns to 500 microns. The average pore diameter of the first support layer 112 may be configured as 0.005 microns to 2 microns. The average pore diameter first support layer 112 may be measured by a mercury porosimeter.

In the present embodiment, the "thickness" of each layer denotes the height of each layer in a direction that is perpendicular to the central axis (referred to below as "radial direction") of the first through-holes TH1 that extend in the longitudinal direction.

The second support layer 113 is disposed on the inner surface 112S of the first support layer 112. Consequently, the second support layer 113 is formed in a tubular shape. The inner surface 113S of the second support layer 113 is the inner surface of the first through-holes TH1. The second support layer 113 can be configured using the same material as the substrate 111. The thickness of the second support layer 113 may be configured 5 microns to 300 microns. The average pore diameter of the second support layer 113 may be configured as 0.003 microns to 0.5 microns. The average pore diameter first support layer 112 may be measured by a mercury porosimeter.

The first glass seal 120 covers the first end surface S1. However, the first glass seal 120 is formed so that the opening of the cell C as described below is not blocked. The first glass seal 120 suppresses penetration of a mixed fluid, that flows into the cell C, into the second end surface S2. As illustrated in FIG. 1, the first glass seal 120 also covers one end part of the side surface S3. The first glass seal 120 is configured from a glass material.

As illustrated in FIG. 2, the first glass seal 120 in the present embodiment has a first seal body part 121 and a first extension part 122. The first seal body part 121 is disposed on the first end surface S1 of the porous support 110. The first seal body part 121 is formed as a porous disc. The first extension part 122 is connected to the first seal body part 121. The first extension part 122 is disposed on an inner surface of the first through-hole TH1. That is to say, the first extension part 122 is the portion of the first glass seal 120 that is accommodated in the first through-hole TH1. The first extension part 122 has a circular shape.

The second glass seal 130 covers the second end surface S2. The second glass seal 130 is formed so that the opening of the cell C is not blocked. The second glass seal 130 suppresses penetration of a mixed fluid into the second end surface S2. The second glass seal 130 is configured from a glass material.

As illustrated in FIG. 2, the second glass seal 130 in the present embodiment has a second seal body part 131 and a second extension part 132. The second seal body part 131 is disposed on the second end surface S2 of the porous support 110. The second seal body part 131 is formed as a porous disc. The second extension part 132 is connected to the second seal body part 131. The second extension part 132 is disposed on an inner surface of the first through-hole TH1. That is to say, the second extension part 132 is the portion of the second glass seal 130 that is accommodated in the first through-hole TH1. The second extension part 132 has a circular shape.

The separation membrane 140 is formed on an inner surface of the first through-hole TH1. As a result, the second membrane 140 is formed in a tubular shape. A cavity on an inner side of the separation membrane 140 is configured as a cell C for enabling passage of a mixed fluid. The inner diameter of the cell C is configured as 1 mm to 5 mm. The thickness of the separation membrane 140 is preferably less than or equal to 10 microns, and more preferably less than or equal to 3 microns. There is no particular limitation on the pore diameter of the separation membrane 140 and it may be suitably adjusted depending on the type of membrane.

The separation membrane 140 is a gas separation membrane, an osmotic evaporating membrane used in osmotic evaporation methods, or a vapor permeation membrane used in the vapor permeation methods. Examples of these types of separation membrane 140 include a known carbon monoxide separation membrane (reference is made for example to Japanese Patent No. 4006107), a helium separation membrane (reference is made for example to Japanese Patent No. 3953833), a hydrogen separation membrane (reference is made for example to Japanese Patent No. 3933907), a carbon membrane (reference is made for example to Japanese Patent Publication Laid-Open No. 2003-286018), a zeolite membrane (reference is made for example to Japanese Patent Publication Laid-Open No. 2004-66188), a silica membrane (reference is made for example to the pamphlet of PCT Laid Open Application 2008/050812), or the like. In particular, a DDR-type zeolite membrane is suitable as the separation membrane 140 when used as a gas separation membrane used to selectively separate carbon dioxide.

The separation membrane 140 according to the present embodiment includes a first connection part 141 and a second connection part 142. The first connection part 141 is the end portion of the separation membrane 140 on the side near the first glass seal 120. The first connection part 141 is connected to the first extension part 122 of the first glass seal 120. The first connection part 141 makes direct contact with the first extension part 122. The first connection part 141 can be defined as the region within 2 mm of the tip end of the separation membrane 140 near to the first glass seal 120. The second connection part 142 is the end portion of the separation membrane 140 on the side near the second glass seal 130. The second connection part 142 is connected to the second extension part 132 of the second glass seal 130. The second connection part 142 makes direct contact with the second extension part 132. The second connection part 142 can be defined as the region within 2 mm of the tip end of the separation membrane 140 near to the second glass seal 130.

In this context, a first thickness P1 of the first connection part 141 is less than or equal to 10 microns. The first thickness P1 is preferably less than or equal to 5 microns, and more preferably less than or equal to 3 microns. In the same manner, a second thickness P2 of the second connection part 142 is less than or equal to 10 microns. The second thickness P2 is preferably less than or equal to 5 microns, and more preferably less than or equal to 3 microns. When the first thickness P1 and the second thickness P2 is low, it is possible to suppress crack formation due to stress created during heating or the like in the first connection part 141 and the second connection part 142, and the permeation amount of the separation membrane 140 can be enhanced.

The first thickness P1 of the first connection part 141 is less than or equal to 3.2 parts of a central thickness P3 in the longitudinal center of the separation membrane 140. That is to say, the ratio of the first thickness P1 to the central thickness P3 is less than or equal to 3.2. The first thickness PI is preferably less than or equal to 3 times the central thickness, and in particular, preferably less than or equal to 2.1 times the central thickness. In the same manner, a second thickness P2 of the second connection part 142 is less than or equal to 3.2 parts of a central thickness P3. That is to say, the ratio of the second thickness P2 to the central thickness P3 is less than or equal to 3.2. The second thickness P2 is preferably less than or equal to 3 times, and in particular, preferably less than or equal to 2.1 times the central thickness P3. In this manner, since the difference between the first thickness P1 and the second thickness P2, and the central thickness P3 is reduced, crack formation in the first connection part 141 and the second connection part 142 during thermal processing after membrane formation can be suppressed.

The respective first thickness P1, second thickness P2 and central thickness P3 may be a measured value obtained by observation of one position of a cross section, or may be an arithmetic average of a plurality of measured values obtained by observation of a plurality of positions in a cross section. Furthermore, the respective first thickness P1, second thickness P2 and central thickness P3 may be an arithmetic average of values measured for a plurality of cells (for example, 5 cells) in one cross section.

Method of Manufacturing Separation Membrane Structure 100

Firstly, a green body for the substrate 111 that includes a plurality of second through-holes TH2 is formed using clay that includes a porous material. The method of forming the green body for the substrate 111 includes use of an extrusion molding method using a vacuum extrusion molding device, in addition to a press molding method or a slip cast method.

Next, the green body for the substrate 111 is fired (for example, 900 to 1650 degrees C., 1 hour to 100 hours) to thereby form the substrate 111.

Next, a porous material, an organic binder, a pH adjusting agent, and a surface active agent, or the like are added to thereby prepare a first support layer slurry.

Then, a filtration method using the first support layer slurry is used to form a green body for the first support layer 112. More specifically, the first support layer slurry is supplied to the second through-holes TH2 of the substrate 111 and drawn by use of a pump from the side surface S3 of the substrate 111 to deposit a green body for the first support layer 112 on the inner surface 111S of the substrate 111.

Thereafter, the green body for the first support layer 112 is fired (for example, 900 degrees C. to 1450 degrees C., 1 hour to 100 hours) to thereby form the first support layer 112.

Next, a second support layer slurry is prepared by mixing a porous material, an organic binder, a pH adjusting agent and a surface active agent, or the like.

Next, a filtration method using the second support layer slurry is used to form a green body for the second support layer 113. More specifically, the second support layer slurry is supplied to an inner side of the first support layer 112, and drawn by use of a pump from the side surface S3 of the substrate 111 to thereby deposit a green body for the second support layer 113 on the inner surface 112S of the first support layer 112.

Thereafter, the green body for the second support layer 113 is fired (for example, 900 degrees C. to 1450 degrees C., 1 hour to 100 hours) to thereby form the second support layer 113. In this manner, a porous support 110 that includes a plurality of first through-holes TH1 is completed.

Next, glass frit is mixed with water and an organic binder to thereby prepare a glass seal slurry.

Then the glass seal slurry is coated onto the first end surface S1 and the second end surface S2 of the porous support 110 to thereby form a green body for the first glass seal 120 and the second glass seal 130. At that time, application of a minute amount of the glass seal slurry to each first through-hole TH1 enables formation of a green body for the first extension part 122 of the first glass seal 120 and the second extension part 132 of the second glass seal 130.

The green body for the first glass seal 120 and the second glass seal 130 is fired (800 to 1000 degrees C.) to thereby form the first glass seal 120 and the second glass seal 130.

Next, the separation membrane 140 is formed on an inner surface of each first through-hole TH1 of the porous support 110. In the following description, an example will be described of forming a zeolite membrane as the separation membrane 140.

Firstly, a seeded slurry is formulated by adding zeolite particles (seed crystals) to a solvent. The diluting solvent includes water, ethanol, an aqueous solution of ethanol, acetone and WA, or the like. When the fluid characteristics and drying characteristics of the seeded slurry are considered, water, ethanol and IPA are preferred due to a viscosity coefficient of less than or equal to 1.66 mPa·s.

Figure 3:
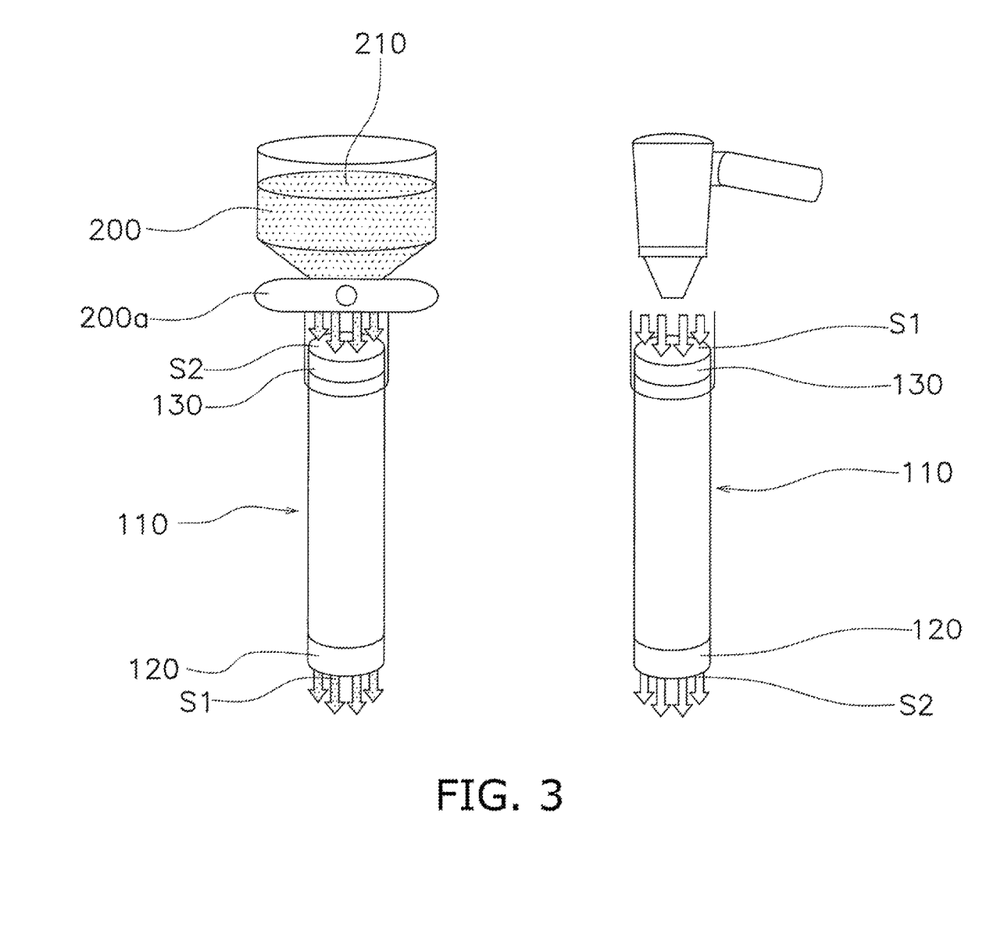
FIG. 3 illustrates a slurry deposition step using a downflow method.
Figure 4:
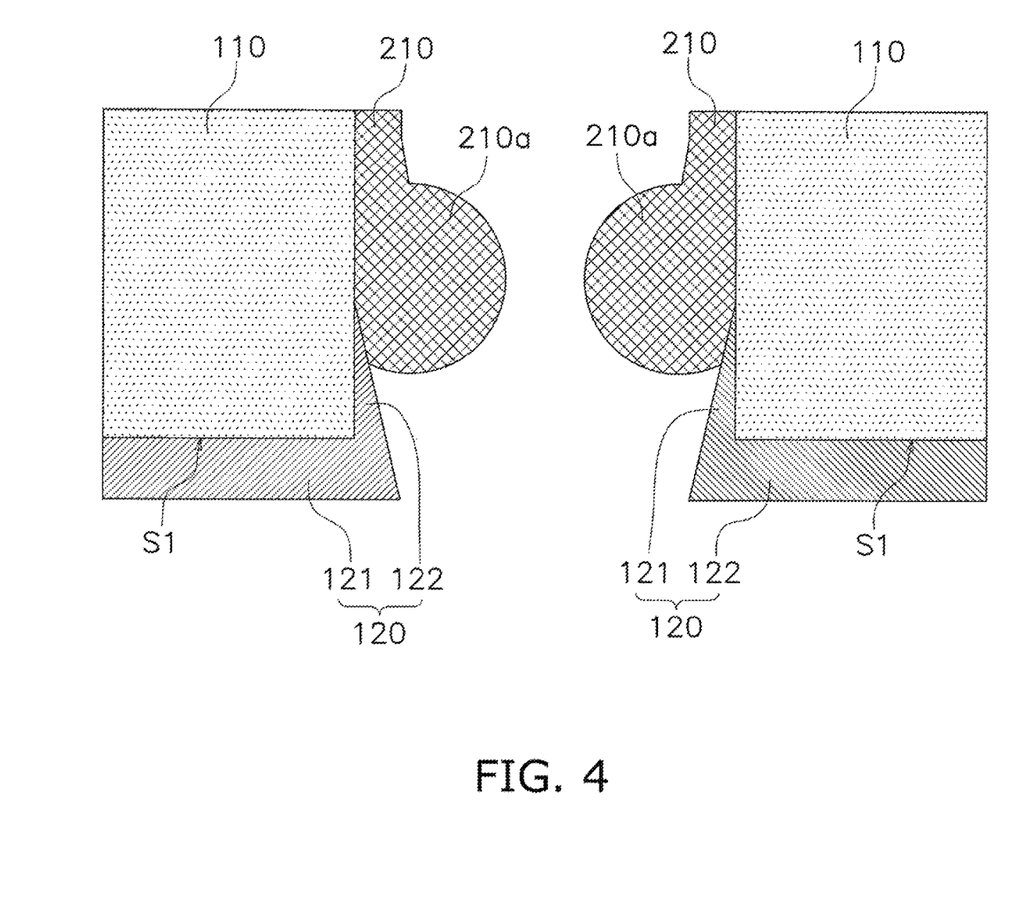
FIG. 4 illustrates the formation of a liquid reservoir of the seeded slurry.

The seeded slurry is attached to an inner surface of the first through-holes TH1 by a downflow method. More specifically, as illustrated in FIG. 3, the porous support 110 is disposed so that the first end surface S1 is lower than the second end surface S2, and the seeded slurry 210 flows downwardly from a wide-mouthed funnel 200 mounted on a cork 200a from the side near to the second end surface S2 into the first through-holes TH1. The seeded slurry 210 flows downwardly by reason of its own weight and becomes attached to an inner surface of the first through-holes TH1. The excess seeded slurry 210 flows out from the first through-holes TH1. At that time, as illustrated in FIG. 4, a liquid reservoir 210a of the seeded slimy 210 is formed in front of the first extension part 122 of the first glass seal 120, that is to say, above the first extension part 122.

Figure 5:
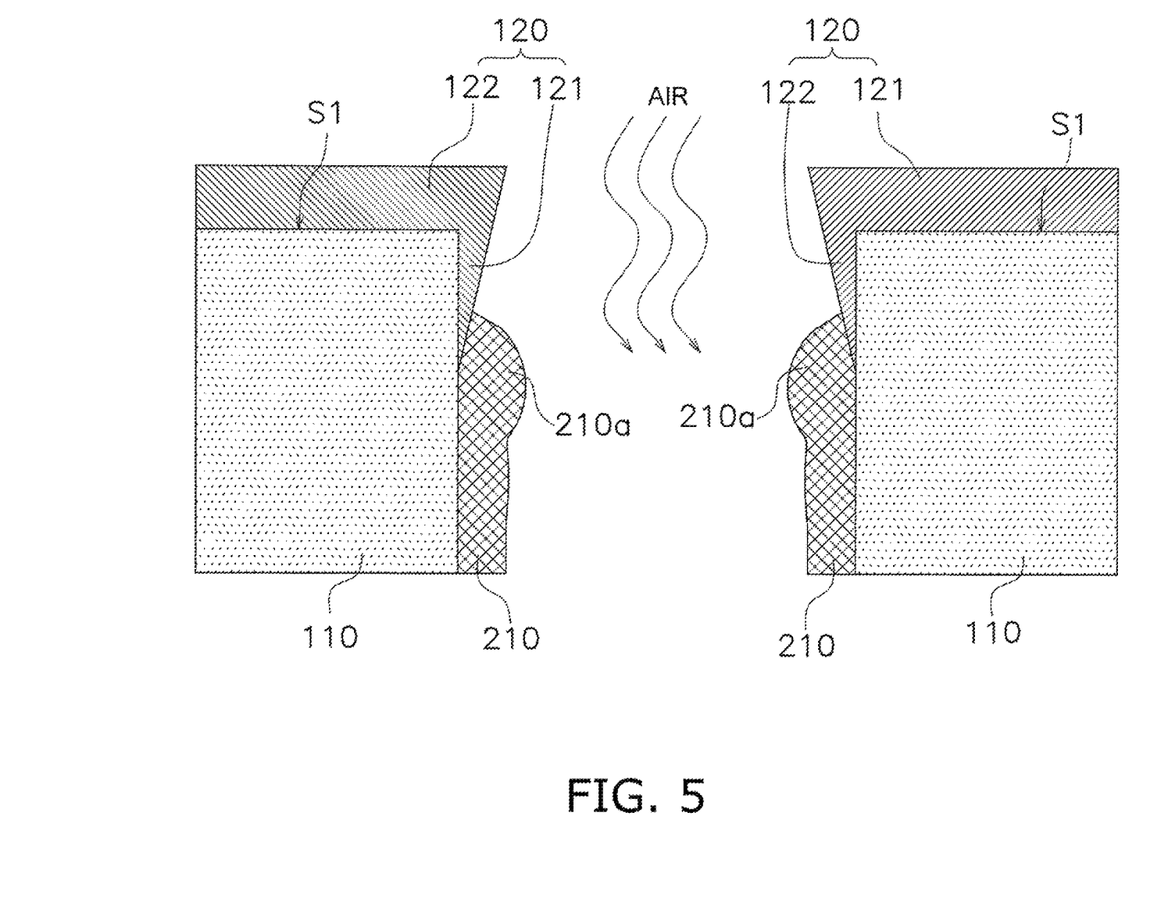
FIG. 5 illustrates the contraction of a liquid reservoir of the seeded slurry.

The seeded slurry 210 is dried by the flow of air into the first through-holes TH1 from the first end surface S1 side to the second end surface S2 side. In this manner, as illustrated in FIG. 5, the liquid reservoir 210a contracts and the seeded slurry 210 is dried by air flow in the direction that is opposite to the direction of flow of the seeded slurry 210. Therefore, since the liquid reservoir 210a becomes contracted, crack formation can be suppressed in the seeded slurry 210 during drying. At that time, as illustrated in FIG. 3, the liquid reservoir 210a is more effectively contracted by a vertical inversion of the porous support 110 so that the second end surface S2 is lower than the first end surface S1. Although there is no particular limitation on the temperature of the air, it may be configured as 10 degrees C. to 35 degrees C. Although there is no particular limitation on the air speed, it may be configured as greater than or equal to 0.5 m/s, and is preferably an air speed of greater than or equal to 1.0 m/s.

The attachment step and air drying step are preferably repeated a plurality of times for the uniform attachment of the seeded slurry 210. In that configuration, on a subsequent attachment step, it is preferred that the seeded slurry 210 flows in the opposite vertical direction to the previous attachment step.

The molar ratio of 1-adamantane amine, silica ($SiO_2$) and water may be configured as 0.002-0.5 for 1-adamantane amine hydrochloride/$SiO_2$, as 1 to 100 for water/$SiO_2$, and 0.01 to 1 for ethylene diamine/$SiO_2$.

The porous support 110 is immersed into a pressure-resistant vessel containing a starting material solution and hydrothermal synthesis is performed. The synthesis temperature may be configured as 110 degrees C. to 200 degrees C., and is preferably 120 degrees C. to 140 degrees C. The synthesis time is 1 hour to 100 hours, and is preferably about 5 to 50 hours in light of operational efficiency, and the stability of the synthesis temperature. The membrane thickness can be controlled by the "synthesis temperature", "the synthesis time" and the "thickness of the seeded slurry 210". In particular, the ratio of the thickness of the zeolite membrane is rate limited by the ratio of the thickness of the seeded slurry 210 attached onto the inner surface of the first through-holes TH1. In the present embodiment, as illustrated in FIG. 2, the ratio respectively of the first thickness P1 and the second thickness P2 relative to the central thickness P3 can be reduced since the liquid reservoir 210a is contracted during the air drying step as described above.

OTHER EMBODIMENTS

Although an embodiment of the present invention has been described, the present invention is not limited to the above embodiment, and various modifications are possible within a scope that does not depart from the spirit of the invention.

(A) In the above embodiment, although the porous support 110 was formed in a cylindrical shape, a polygonal cylinder for example is also possible.

(B) In the above embodiment, although the porous support 110 includes the substrate 111, the first support layer 112 and the second support layer 113, at least one of the first support layer 112 and the second support layer 113 may be omitted, or another support layer may be added to the first support layer 112 and the second support layer 113.

(C) In the above embodiment, although the sectional shape of the first through-holes TH1 in the porous support 110 is circular, a polygonal for example is also possible.

(D) In the above embodiment, the first glass seal 120 covers a portion of the side surface S3. However the side surface S3 may not be covered. In the same manner, the second glass seal 130 also need not cover the side surface S3.

(E) In the above embodiment, although the seeded slurry is attached to the inner surface of the first through-hole TH1 by a downflow method, for example, the seeded slurry may be attached by a dip method or the like. A dip method is a method of attaching the seeded slurry to an inner surface of the first through-hole TH1 by raising and then lowering the seeded slurry in the first through-hole TH1. When attaching the seeded slurry by use of a dip method, the seeded slurry can be dried while contracting the liquid reservoir by causing air flow from the lower end side of the porous support 110 since the liquid reservoir is formed on a lower end side of the porous support 110.

(F) In the above embodiment, although the first thickness P1 of the first connection part 141 in the separation membrane 140 is less than or equal to 3.2 times the central thickness P3, and the second thickness P2 of the second connection part 142 is less than or equal to 3.2 times the central thickness P3, such a relationship does not have to be satisfied in relation to the entire separation membrane 140. Sufficient separation performance can be ensured when the above relationship is satisfied in relation to greater than or equal to 70% of the separation membrane 140 relative to the whole separation membrane 140.

(G) In the above embodiment, although an example of a method of manufacture has been described in relation to a configuration in which a zeolite membrane is formed as the separation membrane 140, and an example of "a seeded slurry" has been given as "the solution for forming the separation membrane", there is no limitation in this regard. For example, when a silica membrane is configured as the separation membrane 140, a silica gel liquid (coating liquid) that is obtained by hydrolysis of tetraethoxysilane in the presence of nitric acid forms "the solution for forming the separation membrane". Furthermore, when a carbon membrane is configured as the separation membrane 140, a solution in which a phenol resin is dissolved in N-methyl-2-pyrrolidone (N-methylpyrrolidone, NMP) forms "the solution for forming the separation membrane".

Examples

The examples of the present invention will be described below. However, the present invention is not thereby limited to the following examples.

Preparation of Samples No. 1 to No. 12

A separation membrane structure according to Samples No. 1 to No. 12 is prepared as described below.

Firstly, a porous support that includes a plurality of through holes is prepared.

Then, glass frit is mixed with water and an organic binder to thereby prepare a glass seal slurry.

Next, a pair of glass seals is formed by attaching and drying (30 degrees C., 12 hours) the glass seal slurry to both end surfaces of the porous support. Then, the first glass seal 120 and the second glass seal 130 are formed by firing (950 degrees C.).

Next, a seeded slurry is prepared by adding zeolite particles to a solvent as illustrated in Table 1. The viscosity coefficient of the solvent that is used is shown in Table 1.

Next, the porous support is disposed in a perpendicular configuration, and the seeded slurry is attached to an inner surface of each through-hole. As shown in Table 1, in Sample No. 2, the seeded slurry is attached by use of a dip method, and the seeded slurry is attached by a downflow method in examples other than Sample No. 2.

Next, the seeded slurry attached to the inner surface of each through-hole is dried. At that time, as shown in Table 1, in Sample Nos. 1 to 8 and 12, air flow is directed in a direction opposite to the direction of seeded slurry flow, in Sample No. 9 and 10, air flow is directed in the same direction as the direction of seeded slurry flow, and in Sample No. 11, there is no air flow. Furthermore as shown in Table 1, in Sample Nos. 1, 4, 6 to 8, and 12, air drying is performed in a state in which the porous body is vertically inverted.

Next, as shown in Table 1, the downflow step of the seeded slurry and the drying step for the seeded slurry are repeated 1 to 3 times.

Then, after placing 7.35 g of ethylene diamine (manufactured by Wako Pure Chemical Industries, Ltd.) in a fluororesin wide-mouth container, 1.16 g of 1-adamantane amine (manufactured by Aldrich) is added and dissolved so that no 1-adamantane amine precipitate remains. Next, 98.0 g of 30 wt % silica sol (Trade name: Snowtex S, manufactured by Nissan Chemical Industries, Ltd.) and 116.55 g of distilled water are mixed in a separate container, stirred gently, and then added to the wide-mouth container and strongly agitated to thereby prepare a sol for membrane formation. The alumina support with the DDR-type zeolite seed crystals attached is placed in a fluororesin inner cylinder (internal volume 300 ml) of a stainless steel pressure vessel, the membrane-forming sol is added, and thermal processing (hydrothermal synthesis: 130 degrees C., 24 hours) is performed to thereby form a high silica DDR-type zeolite membrane. Then, the alumina support is washed and dried for greater than or equal to 12 hours at 80 degrees C. Then, the alumina support is heated to 450 degrees C. in an electric furnace and retained for 50 hours to thereby combust and remove the 1-adamantane amine.

The thickness of a portion (that is to say, the first connection part) within 2 mm from one end of the DDR-type zeolite membrane, the thickness of a portion (that is to say, the second connection part) within 2 mm from the other end, and the thickness of the longitudinal central part are measured by observation of a cross section. The measured value is the average value of 5 cell portions. The measurement results are shown in Table 1.

Measurement of Separation Performance α

Firstly a mixed gas of carbon dioxide and methane that has a temperature of 25 degrees C. (volume ratio of each gas=50:50) is caused to flow in an inner portion of a cell of the DDR-type zeolite membrane of each sample at 0.3 MPa to thereby measure the gas concentration on the permeation side and the supply side that separate the zeolite membrane. A separation performance α is calculated based on the following formula (1).

(Formula 1)

$$\alpha = \frac{\text{concentration of } CO_2 \text{ on permeation-side} / \text{concentration of } CH_4 \text{ on permeation-side}}{\text{concentration of } CO_2 \text{ on supply-side} / \text{concentration of } CH_4 \text{ on supply-side}} \quad (1)$$

The calculation results for the separation performance α are shown in Table 1. The separation performance α shown in Table 1 is a value that is normalized with reference to a predetermined value.

TABLE 1

| | Seeded Slurry | | | | Drying Conditions | | | | Thickness of Zeolite Membrane | | | | |
| | | | | | Air | | | | | Ratio of First | | Ratio of Second | |
| Sample No. | Solvent | Viscosity Ratio of Solvent (mPa·s) | Coating Method | Number of Coats | direction relative to seeded slurry flow | Air Speed (m/s) | Inverted | Central Part (μm) | First Connection Part (μm) | Connection Part/Central Part | Second Connection Part (μm) | Connection Part/Central Part | Separation Performance α |
|---|---|---|---|---|---|---|---|---|---|---|---|---|---|
| 1 | Ethanol | 1.084 | Downflow | 1 | Opposite direction | 6.0 | Yes | 1.0 | 1.4 | 1.4 | 1.1 | 1.1 | 250 |
| 2 | Ethanol | 1.084 | Dip | 2 | Opposite direction | 5.0 | No | 3.0 | 6.0 | 2.0 | 6.2 | 2.1 | 200 |
| 3 | Ethanol | 1.084 | Downflow | 3 | Opposite direction | 3.0 | No | 2.0 | 5.6 | 2.8 | 4.9 | 2.5 | 150 |
| 4 | Ethanol | 1.084 | Downflow | 2 | Opposite direction | 10.0 | Yes | 2.0 | 1.0 | 0.5 | 1.0 | 0.5 | 300 |
| 5 | Water | 0.890 | Downflow | 3 | Opposite direction | 1.0 | No | 3.0 | 9.0 | 3.0 | 8.7 | 2.9 | 150 |
| 6 | Ethanol | 1.084 | Downflow | 2 | Opposite direction | 0.5 | Yes | 2.0 | 6.2 | 3.1 | 6.4 | 3.2 | 88 |
| 7 | Ethanol | 1.084 | Downflow | 2 | Opposite direction | 7.0 | Yes | 9.1 | 9.9 | 1.1 | 4.0 | 0.4 | 160 |
| 8 | IPA | 1.660 | Downflow | 2 | Opposite direction | 3.0 | Yes | 1.0 | 3.1 | 3.1 | 3.2 | 3.2 | 113 |
| 9 | Ethanol | 1.084 | Downflow | 1 | Same direction | 6.0 | No | 2.0 | 10.0 | 5.0 | 3.0 | 1.5 | 20 |
| 10 | Ethanol | 1.084 | Downflow | 2 | Same direction | 10.0 | No | 1.0 | 4.0 | 4.0 | 4.0 | 4.0 | 30 |
| 11 | Ethanol | 1.084 | Downflow | 2 | — | 0.0 | No | 3.0 | 10.5 | 3.5 | 9.1 | 3.0 | 25 |
| 12 | Water (PVA added as thickening agent) | 2.000 | Downflow | 2 | Opposite direction | 6.0 | Yes | 1.5 | 10.0 | 6.7 | 9.8 | 6.5 | 5 |

As shown in Table 1, Samples Nos. 1 to 8 exhibit superior separation performance α. This is due to the fact that crack formation in the DDR-type zeolite membrane can be suppressed by configuring the thickness of each connection part that is connected with each glass seal of the DDR-type zeolite membrane to be less than or equal to 3.2 times the thickness of the longitudinal central part. In particular, an even more superior separation performance α can be obtained by a configuration in which the thickness of each connection part is less than or equal to 2.1 times the thickness of the longitudinal central part.

On the other hand, in Sample Nos. 9 to 12, a superior separation performance α was not obtained. This is due to the fact that cracks formed as a result of excessive localized thickness in each connection part that is connected with each glass seal in the DDR-type zeolite membrane.

As shown in Table 1, in Sample Nos. 1 to 5, 7 and 8 in which the air speed is greater than or equal to 1.0 m/s, a further enhancement to the separation performance α was obtained in comparison to Sample No. 6 in which the air speed was 0.5 m/s.

The invention claimed is:

1. A separation membrane structure comprising;
   a porous support including through-holes which connect a first end surface and a second end surface,
   a first glass seal configured to cover the first end surface, and
   a separation membrane formed on an inner surface of the through-holes,
   the first glass seal having a first seal body part and a first extension part, the first seal body part disposed on the first end surface, the first extension part connected to the first seal body part and disposed on the inner surface of the through-holes,
   the separation membrane having a first connection part, at least a part of the first connection part disposed on the first extension part of the first glass seal, and
   a first thickness of the first connection part being less than or equal to 10 microns, greater than a center thickness at a longitudinal center of the separation membrane, and less than or equal to 3.2 times the center thickness at the longitudinal center of the separation membrane.

2. The separation membrane structure according to claim 1, wherein the first thickness is less than or equal to 2.1 times the central thickness.

3. The separation membrane structure according to claim 1 further comprising;
   a second glass seal configured to cover the second end surface, wherein
   the second first glass seal has a second seal body part and a second extension part, the second seal body part disposed on the second end surface, the second extension part connected to the second seal body part and disposed on the inner surface of the through-holes,
   the separation membrane has a second connection part connected to the second extension part of the second glass seal, and
   a second thickness of the second connection part is less than or equal to 10 microns, and less than or equal to 3.2 times the center thickness.

4. The separation membrane structure according to claim 3, wherein the second thickness is less than or equal to 2.1 times the central thickness.

5. The separation membrane structure according to claim 1, wherein the separation membrane is a zeolite membrane.

6. A method of manufacturing a separation membrane structure comprising;
   forming a first glass seal configured to cover a first end surface of a porous support and a second glass seal configured to cover a second end surface of the porous support,
   making the first end surface lower than the second end surface and depositing a slurry for forming a separation membrane on an inner surface of through-holes that connect the first end surface and the second end surface, and
   drying the slurry by air-flow into the through-holes from the first end surface side to the second end surface side,
   wherein the second end surface is lower than the first end surface in the step of drying of the slurry.

7. The method of manufacturing a separation membrane structure according to claim 6, wherein
   the separation membrane is a zeolite membrane, and
   the slurry contains zeolite particles and a solvent.

8. The method of manufacturing a separation membrane structure according to claim 7, wherein
   a viscosity coefficient of the solvent is less than or equal to 1.66 mPa·s.

9. The method of manufacturing a separation membrane structure according to claim 7, wherein
   the solvent contains at least one of water and ethanol.

10. The method of manufacturing a separation membrane structure according to claim 6, wherein
    an air speed in the through-holes in the step of drying of the slurry is greater than or equal to 1.0 m/s.

* * * * *